United States Patent [19]

Matsumoto

[11] Patent Number: 5,450,153
[45] Date of Patent: Sep. 12, 1995

[54] PHOTOSENSITIVE MATERIAL HANDLING APPARATUS

[75] Inventor: Nobuo Matsumoto, Kanagawa, Japan

[73] Assignee: Fuji Photo Film Co., Ltd., Kanagawa, Japan

[21] Appl. No.: 216,413

[22] Filed: Mar. 23, 1994

[30] Foreign Application Priority Data

Mar. 25, 1993 [JP] Japan .................................. 5-066840

[51] Int. Cl.⁶ .............................................. G03D 13/00
[52] U.S. Cl. ...................... 354/298; 354/300; 354/319; 354/340
[58] Field of Search ............................ 354/319–322, 354/300, 298, 339, 340, 344, 345

[56] References Cited

U.S. PATENT DOCUMENTS

| | | | |
|---|---|---|---|
| 5,124,743 | 6/1992 | Shiota | 355/30 |
| 5,227,827 | 7/1993 | Murakami | 354/333 |
| 5,325,144 | 6/1994 | Yoshikawa et al. | 354/319 |
| 5,335,038 | 8/1994 | Blackman | 354/319 |
| 5,343,266 | 8/1994 | Pummell et al. | 354/340 |

*Primary Examiner*—D. Rutledge
*Attorney, Agent, or Firm*—Sughrue, Mion, Zinn, Macpeak & Seas

[57] ABSTRACT

A photosensitive material handling apparatus comprising: separating means for withdrawing a photosensitive material from the first cartridge and for separating the photosensitive material from the first cartridge; accommodating means for conveying the photosensitive material in an unexposed state, and successively accommodating the photosensitive material within a second cartridge, of which an inner portion and an outer portion can be shielded from the light, control means for stopping accommodation of the photosensitive material within the second cartridge by the accommodating means in a state in which image portions, which are recorded on the photosensitive material, are completely accommodated within the second cartridge and a rear end portion of the photosensitive material is withdrawn from the second cartridge by a predetermined length. Even if the photosensitive material is accommodated within the cartridge through which the light can be penetrated, such photosensitive material can be processed by the existing photographic processing apparatus.

22 Claims, 12 Drawing Sheets

PHOTOSENSITIVE MATERIAL HANDLING APPARATUS

BACKGROUND OF THE INVENTION

1. Field of the Invention

The present invention relates to a photosensitive material handling apparatus.

2. Description of the Related Art

A film which is currently on the market has its rear end engaged to a spool of a cartridge which serves as a film case. The film is taken up onto the spool and accommodated within the cartridge. In addition, even if a leading end portion of the film is withdrawn from the cartridge, the entrance/exit port for the film is shielded so that light does not penetrate through the interior of the cartridge. The leading end portion of the film is withdrawn from the interior of the cartridge by a predetermined amount before photography. In case of photographing images, perforations, which are provided at the leading end portion of the film, are hooked on a sprocket provided within a camera so as to load the film in the camera. Further, even in a case in which the photographing of the images has been completed, the film has been developed, and the images recorded on the film have been printed onto photographic printing paper, the leading end portion of the film is withdrawn from the interior of the cartridge by a predetermined amount. In this state, the film is run through various types of photographic processing apparatuses and a process such as developing or the like is performed.

On the other hand, in recent years, a magnetic recording portion is provided on the film. In this magnetic recording portion, information relating to a film such as the type of film or the like and information which specifies the number of developed sheets and a user can been recorded. In the film on which the magnetic recording portion is provided, the film is cut at each predetermined image frame in the conventional manner and returned to the user with the film being accommodated within a film bag. Since the magnetic portion is separated when the images recorded on the film are printed, it is difficult to read the information recorded on the magnetic recording portion. Therefore, it has been proposed that after processing, the film should be rewound into the cartridge and then returned to the user.

Further, with reference to the above description, the automation of the photographic processing steps is taken into account. A newly-structured cartridge has been proposed in which even if the leading end portion of the film is accommodated within the cartridge, the film is automatically withdrawn from the cartridge. In this cartridge, the opening area of the entrance/exit port for the film is large enough to facilitate the withdrawal of the film. Light is shielded by a door on the cartridge which opens and closes. In a state in which the leading end portion of the film is withdrawn from the cartridge, the door for shielding light is open. Consequently, light penetrates through the interior of the cartridge and exposes the film. As a result, the film is usually kept in a state in which the leading end portion of the film is accommodated within the cartridge and the door is closed.

In order to process the film, which is accommodated within the cartridge and whose images are exposed, in an existing photographic processing apparatus, it is necessary to add a function to the photographic processing apparatus in which the cartridge is set in the photographic processing apparatus, and thereafter, the film is automatically withdrawn from the cartridge. Accordingly, the film is prevented from being unnecessarily exposed. However, it is extremely expensive to add the above-described function to the existing numerous and various types of photographic processing apparatuses, and therefore, difficult to be achieve.

SUMMARY OF THE INVENTION

With the afforementioned in view, an object of the present invention is to obtain a photosensitive material handling apparatus in which even if light penetrates through a cartridge in a state in which a leading end portion of the photosensitive material accommodated within the cartridge is exposed to the exterior, a photosensitive material, which is accommodated within the cartridge, can be processed by an existing photographic processing apparatus.

To accomplish the above-described purpose, a photosensitive material handling apparatus relating to the present invention comprising: separating means for withdrawing an elongated photosensitive material, which has been photographically exposed, is undeveloped and is accommodated within a first cartridge, from said first cartridge in a state in which the photosensitive material is not exposed to ambient light, said separating means separating the photosensitive material from said first cartridge; accommodating means for conveying the photosensitive material, which is separated from the first cartridge by said separating means, without exposure to ambient light; and successively accommodating the photosensitive material within a second cartridge, of which an inner portion and an outer portion can be shielded from light, in a state in which an end portion of the photosensitive material is exposed to the exterior; a plurality of detecting means for detecting an indicator which is provided at an end portion off the photosensitive material or at a predetermined position of the photosensitive material; and control means for determining the position of the end portion of said photosensitive material based on the results detected by said plurality off detecting means, and when the end portion detected by the respective detecting means is located at the position separated by a predetermined distance from said second cartridge, said control means stops accommodation of the photosensitive material within the second cartridge by said accommodating means.

According to the present invention, separating means withdraws the elongated photosensitive material, which has been shot, is undeveloped and is accommodated within the first cartridge, from the first cartridge and separates the photosensitive material from the first cartridge. The separated photosensitive material is conveyed by accommodating means, and successively accommodated within the second cartridge, of which the inner portion and the outer portion can be shielded from light, in a state in which the end portion of the photosensitive material is exposed to the exterior. The position of the end portion of the photosensitive material is determined. When the determined end portion is located at the position separated by a predetermined distance from the second cartridge, accommodation of the photosensitive material within the second cartridge by the accommodating means is stopped.

Consequently, the end portion off the photosensitive material is kept at a position separated by a predetermined distance from the second cartridge. In this state, light does not penetrate through the second cartridge so that the photosensitive material, which is accommodated within the second cartridge, will not be carelessly exposed to ambient light. Accordingly, the photosensitive material, which is accommodated within the second cartridge, can be processed by the existing photographic processing apparatus. Therefore, even if light penetrates through said first cartridge in a state in which the end portion of the photosensitive material, which is accommodated within the first cartridge, is exposed to the exterior, the photosensitive material, which is accommodated within said first cartridge, can be processed by the existing photographic apparatus.

Further, according to the present invention, a plurality of detecting means is provided for detecting the indicator which is provided at the end portion of the photosensitive material or at the predetermined position of the photosensitive material. The position of the end portion of the photosensitive material is determined based on the results detected by the plurality of detecting means. When the end portion, which is determined by the respective detecting means, is located at the position separated by the predetermined distance from the second cartridge, accommodation of the photosensitive material within the second cartridge by the accommodating means is stopped. Accordingly, even if the position of the end portion of the photosensitive material is wrongly determined due to, for example, failure of or wrong detection by any of the plurality of the detecting means, accommodation of the photosensitive material by the accommodating means will not be stopped in a state in which accommodation of the photosensitive material within the second cartridge is insufficient. Therefore, an inconvenience will not occur in which the exposed images on said photosensitive material are lost due to the careless sensitization or exposing or the like.

According to the present invention as described above, the elongated photosensitive material, which is accommodated within the first cartridge, is withdrawn from the first cartridge so as to separate the photosensitive material from the first cartridge. The photosensitive material is conveyed, and successively accommodated within the second cartridge, of which the inner portion and the outer portion can be shielded from light, in a state in which the end portion of the photosensitive material is exposed to the exterior. A plurality of detecting means is provided for detecting the indicator which is provided at the end portion of the photosensitive material or at the predetermined position of the photosensitive material. The position of the end portion of the photosensitive material is determined based on the results detected by the plurality of detecting means. When the end portion, which is determined by the respective detecting means, is located at the position separated by a predetermined distance from the second cartridge, accommodation of the photosensitive material within the second cartridge by the accommodating means is stopped. The photosensitive material is accommodated within the cartridge, through which light cannot penetrate, in a state in which the leading end portion of the photosensitive material, which is accommodated within the first cartridge, is exposed to the exterior. Therefore, the present invention achieves a superior effect in that such photosensitive material can be processed by the existing photographic apparatus.

DESCRIPTION OF THE PREFERRED EMBODIMENTS

Figure 1:
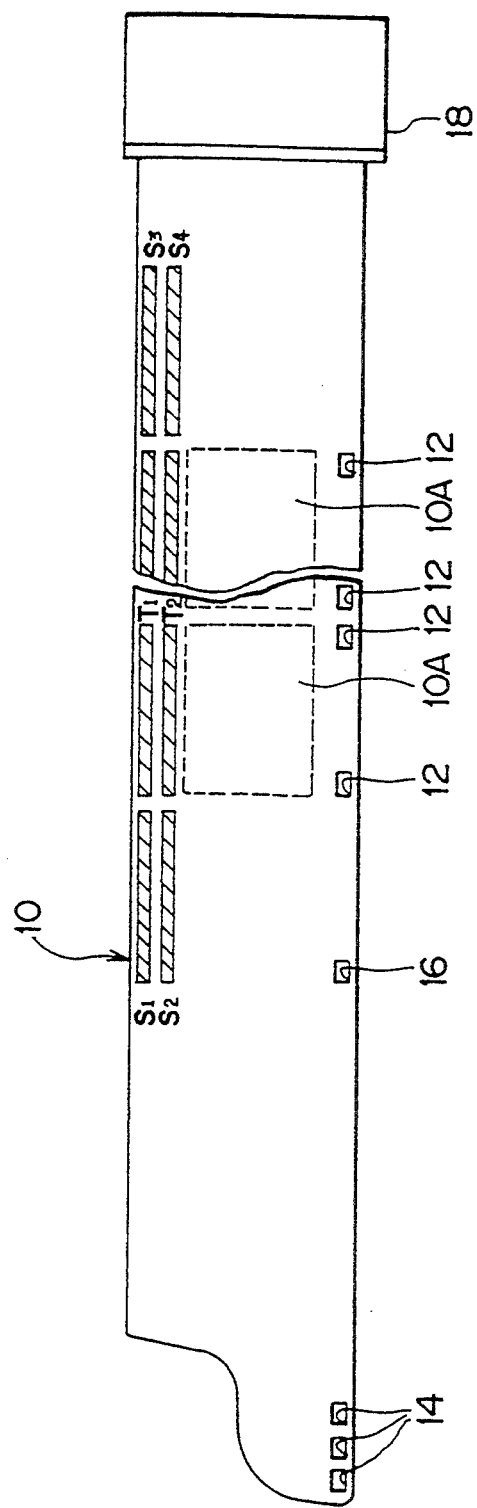
FIG. 1 is a plan view of a film relating to the present embodiment.

An embodiment of the present invention will be described hereinafter with reference to the drawings. In FIG. 1, a film 10 relating to the present embodiment is illustrated. The film 10 of the present embodiment may include a negative film, a positive film, a color film and a black and white film.

Emulsion is applied to one surface of an elongated base of the film 10 so as to form an emulsion layer. Images 10A are exposed and recorded by an unillustrated camera or the like. At a transverse direction end portion of the film 10A, a plurality of perforations 12 corresponding to the images 10A are provided along a longitudinal direction of the film 10. Two perforations 12 respectively correspond to a single image 10A, and are provided at locations corresponding to longitudinal direction end portions of the images 10A. In addition, a plurality of perforations 14 are provided at the leading end portion of the film 10, and a perforation 16 is provided between the perforations 12 and perforations 14 so as to correspond to magnetic tracks S1 and S2.

Further, a transparent magnetic material is applied to both the surface on which the emulsion layer was formed and the opposite surface so as to form a magnetic recording layer. The magnetic recording layer is used for magnetic tracks S1, S2, S3, S4, T1, and T2. The leading end portion side of the film 10 onto which the images 10A are not recorded is used as magnetic tracks S1 and S2. The rear end portion side of the film 10 onto which the images 10A are not recorded is used as the magnetic tracks S3 and S4. Portions corresponding to the images 10A are used as the magnetic tracks T1 and T2. The tracks S1 and S2 record film information which is different for each film, for example, the type of film such as a negative film, a positive film, a color film or a black and white film, a DX code, the manufacturer's name, the manufacturing date or the like. The tracks T1 and T2 record shooting information which is different for each film. For example, the date of shooting, the type of light source, the aspect ratio of images, the magnification of photographing, the vertical direction of images or the like.

Figure 2A:
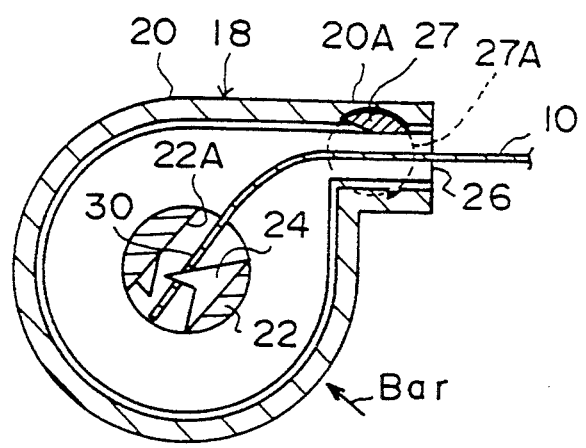
FIG. 2A is a cross-sectional view of a cartridge illustrating a state in which an opening of the cartridge is opened by a cam.
Figure 2B:
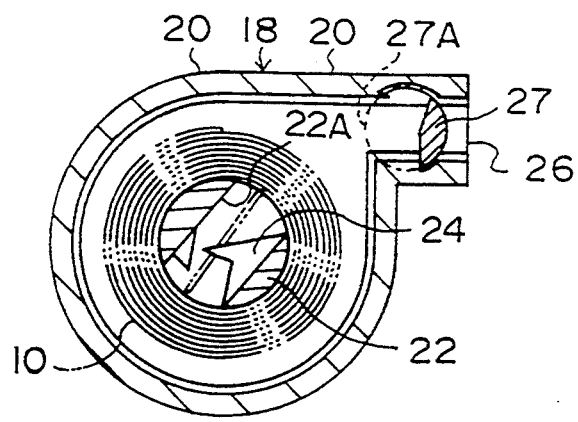
FIG. 2B is a cross-sectional view of the cartridge illustrating a state in which the opening of the cartridge is shielded by the cam.

As shown in FIGS. 2A and 2B, a cartridge 18 corresponding to a first cartridge of the present invention is formed by a substantially cylindrical cartridge main body 20, and a spool 22 which is rotatably supported within the cartridge main body 20. A projecting portion 20A is provided at an outer peripheral portion of the cartridge main body 20, and an opening 26 through which the film 10 can pass is formed at an end portion of the projecting portion 20A. an addition, a slit-shaped through-hole 22A is provided in the spool 22, and a projection 24 is provided on an inner wall of the through-hole 22A.

Figure 3:
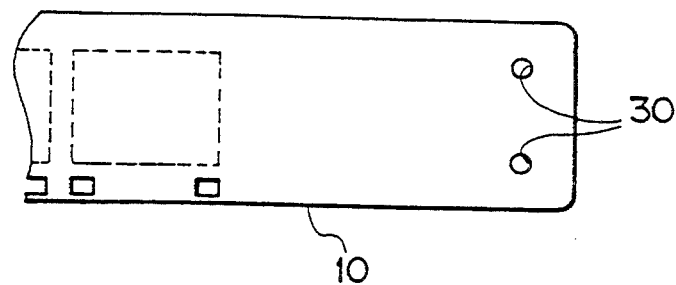
FIG. 3 is a plan view illustrating a rear end portion of the film.

As shown in FIG. 3, when the film 10 is manufactured, corner portions are rounded and holes 30 are punched in the rear end portion of the film 10. As shown in FIG. 2A, the projection 24 of the spool 22 is inserted into the holes 30 which are punched at the rear end portion of the film 10 so that the rear end portion thereof is engaged with the spool 22. When the spool 22 is rotated, the film 10 is trained around the outer circumference of the spool 22 so as to be accommodated within the cartridge 18.

In addition, inside the projecting portion 20A, a cam 27 is provided so as to correspond to the opening 26. Both ends of the cam 27 are connected to an exposing portion 27A (see FIG. 7) which is exposed to an exterior of the projecting portion 20A. The cam 27 is rotatably supported by the cartridge main body 20 via the exposing portion 27A. The cam 27 is rotated to a position shown in FIG. 2A or a position shown in FIG. 2B. In the state shown in FIG. 2B, the cam 27A shields the opening 26 so that outside light does not penetrate through the cartridge main body 20, and the film 10 which is accommodated within the cartridge main body 20 is prevented from being sensitized or exposed. Further, the leading end portion of the film 10 is withdrawn from the interior of the cartridge 18 in a state in which the cam 27 is rotated to the position shown in FIG. 2A and the opening 26 is opened. In this state, light penetrates through the interior of the cartridge main body 20. Accordingly, in a case in which the cartridge 18 is not handled in a darkroom, it is necessary to handle it in the state shown in FIG. 2B, i.e., the state in which the film 10 is completely accommodated within the cartridge main body 20 and the cam 27 shields the opening 26.

In addition, an unillustrated bar code is recorded at a position, shown by arrow "Bar" in FIG. 2A, on an outer side surface of the cartridge main body 20. The bar code represents the aforementioned film information and cartridge identification information for identifying an individual cartridge 18. Further, in a case in which images are exposed by a camera and in a case in which a developing process is effected by an unillustrated film processor, by additionally recording a bar for each case, the bar code represents whether the film 10, which is accommodated within the cartridge 18, is exposed or whether the film 10 is developed.

After the images of the film 10 are exposed by the camera, the entire film 10 including the leading end portion is taken to a "DPE shop" ("DPE shop" as used herein refers to a place where a film is taken for processing) or the like while being accommodated in the cartridge 18 for processing such as developing. The cartridge 18 which is accepted at the DPE shop is processed by a photosensitive material handling apparatus 40 (see FIG. 5) which is related to the present invention.

Figure 5:
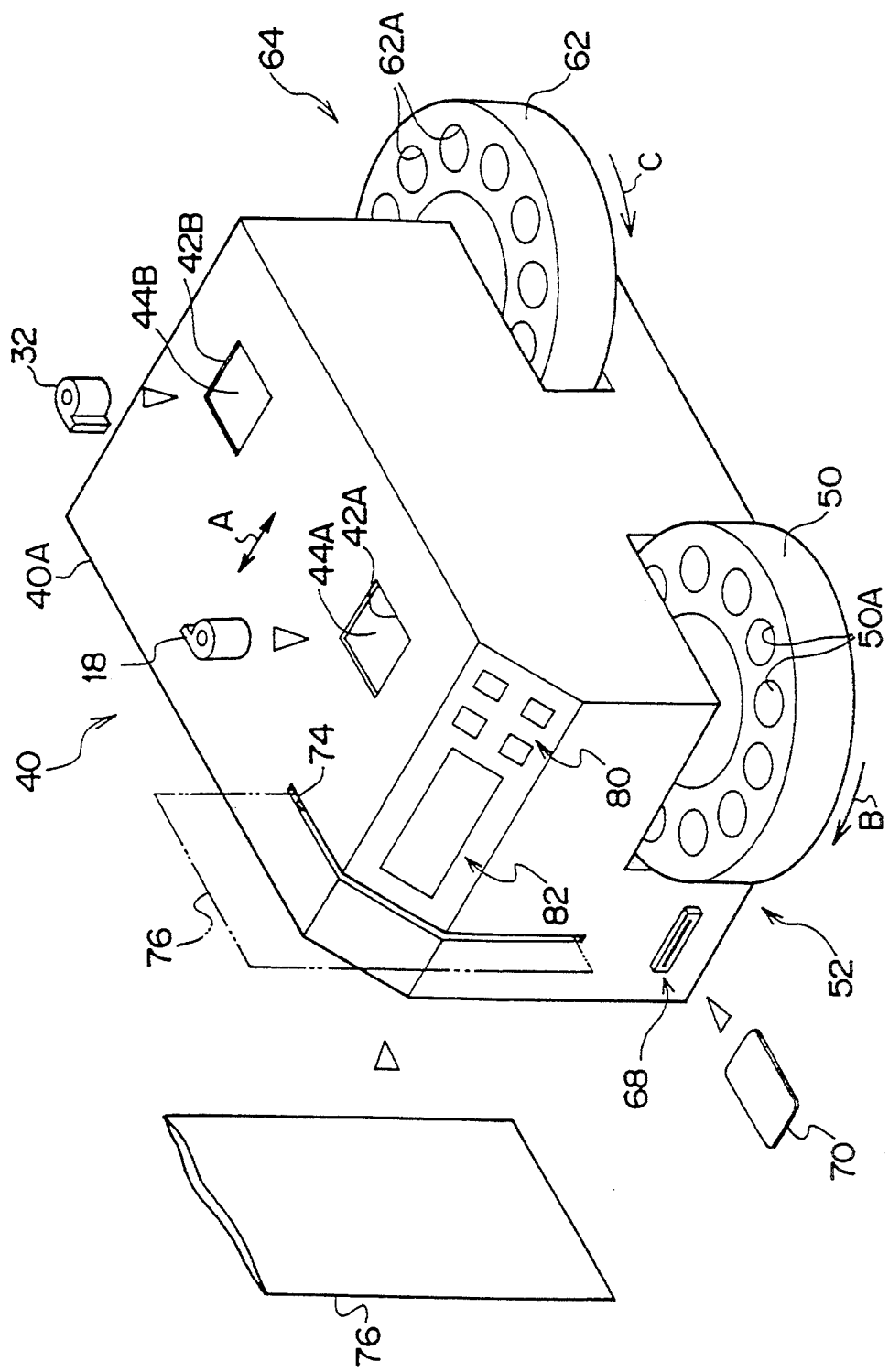
FIG. 5 is a perspective view illustrating an exterior of a photosensitive material handling apparatus.

Next, the photosensitive material handling apparatus 40 will be explained in detail. FIG. 5 shows openings 42A and 42B are provided in the upper surface of the casing 40A. Light-shielding covers 44A and 44B are provided in an interior thereof so as to correspond to the openings 42A and 42B. The light-shielding covers 44A and 44B are slidable along the directions of arrow A in FIG. 5, and are moved by a light-shielding cover opening/closing actuator 46 (see FIG. 8) to a position (a position shown in FIG. 5) in which the openings 42A and 42B are closed or to a position in which the openings 42A and 42B are opened.

The light-shielding cover opening/closing actuator 46 is connected to a controller 48, and opens and closes the light-shielding covers 44A and 44B in accordance with an instruction from the controller 48. In a state in which the opening 42A is opened, an operator inserts the aforementioned cartridge 18 into the photosensitive material handling apparatus 40 via the opening 42A. In a state in which the opening 42B is opened, the operator inserts an intermediate cartridge 32, which corresponds to a second cartridge of the present invention, into the photosensitive material handling apparatus 40 via the opening 42B.

Figure 4:
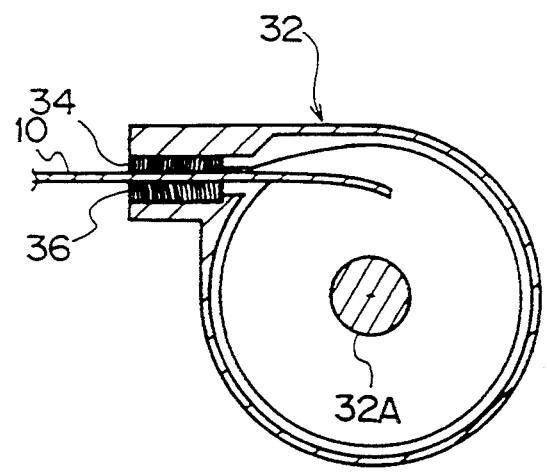
FIG. 4 is a cross-sectional view of an intermediate cartridge.

As shown in FIG. 4 and FIGS. 2A and 2B, the intermediate cartridge 32 is formed substantially similar to the cartridge main body 20 of the cartridge 18 in FIG. 2. A spool 32A is different from the spool 22 in FIG. 2, and neither through-hole nor projection is formed at the spool 32A. Consequently, the film 10, which is fed into the intermediate cartridge 82 via an opening 84, is accommodated within the intermediate cartridge 82 in a state in which the leading end portion of the film 10 is free. In addition, a light-shielding cloth 36 is provided at an inner wall of the opening 34 through which the film 10 passes. Compared to the cartridge 18, an amount of the light-shielding cloth 36 is large and an opening area of the opening 34 is small so that even if the end portion of the film 10 projects from the opening 34, light does not penetrate through the interior of the intermediate cartridge 32.

On the other hand, a loading portion 52 is provided diagonally below the opening 42A of the photosensitive material handling apparatus 40 so as to load a container 50 which accommodates the cartridge 18. The container 50 is formed into a disc-shape. In a vicinity of an outer circumferential side in the radial direction of the container 50, a plurality of circular holes 50A are provided along a circumferential direction of the container 50. Dimensions of inner diameters of the circular holes 50A are large enough to accommodate the cartridge 18. In addition, the outer circumferential portion of the container 50, at which the circular holes 50A are provided, is rotatable around a circumference of a central portion. When the container 50 is loaded into the loading portion 52, the photosensitive material handling apparatus 40 can rotate and drive the container 50 in the direction of arrow B in FIG. 5 by a container rotating actuator 54 (see FIG. 8). The container rotating actuator 54 is connected to the controller 48 and rotates the container 50 in accordance with an instruction from the controller 48.

Figure 6:
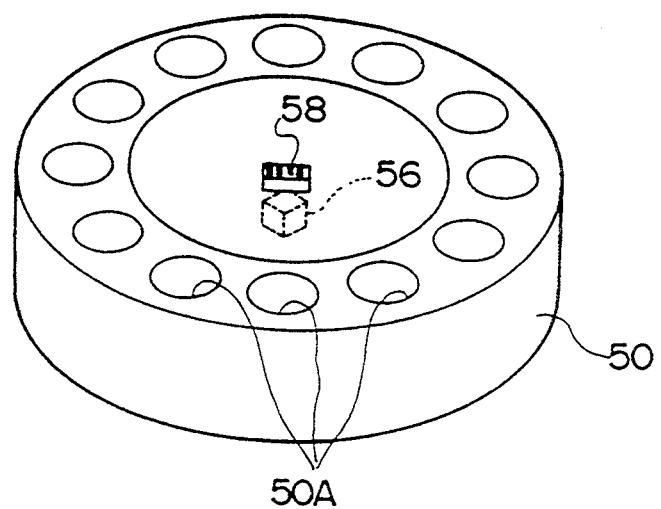
FIG. 6 is a perspective view illustrating a container in which the cartridge is accommodated.

As shown in FIG. 6, a storing device 56 is provided at a central portion of the container 50. The storing device 56 is formed by a semiconductor memory which is non-volatile and writable. The storing device 56 is connected to a terminal 58 which is provided on an upper surface of the central portion of the container 50. A terminal 60 (see FIG. 8), which corresponds to the previously-described terminal 58, is provided at the loading portion 52 and is connected to the controller 48. Accordingly, when the container 50 is loaded into the loading portion 52, the controller 48 and the storing device 56 of the container 50 are connected so that information which is stored in the storing device 56 can be read and written.

Returning to FIG. 5, a loading portion 64 is provided diagonally below the opening 42B so as to load a container 62 which accommodates the intermediate cartridge 32. The container 62 is formed substantially similar to the container 50. In a vicinity of an outer circumferential side in the radial direction of the container 62, a plurality of circular holes 62A are provided along a circumferential direction of the container 62. Dimensions of inner diameters of the circular holes 62A are large enough to accommodate the cartridge 32. When the container 62 is loaded into the loading portion 64, the photosensitive material handling apparatus 40 can rotate and drive the container 62 in the direction of arrow C by a container rotating actuator 66 (see FIG. 8). The container rotating actuator 66 is connected to the controller 48 and rotates the container 62 in accordance with an instruction from the controller 48.

A memory card loading portion 68 is provided at the loading portion 52 side. Similar to the aforementioned container 50, a memory card 70, which is loaded into the memory card loading portion 68, includes an unillustrated storing device inside and is connected to an unillustrated terminal which is provided on the memory card 70. A terminal 72 (see FIG. 8), which corresponds to the previously-described terminal, is provided in an interior of the memory card loading portion 68 and is connected to the controller 48. Accordingly, when the memory card 70 is loaded into the memory card loading portion 68, the storing device of the memory card 70 and the controller 48 are connected so that information which is stored in the previously-described storing device can be read and written.

On the other hand, a slit 74 is provided in a portion corresponding to an upper direction of the memory card loading portion 68. The slit 74 is a DP bag loading portion for loading a DP bag 76, which is shown by an imaginary line in FIG. 5. A DP bag information recording portion 78 (see FIG. 8) is provided at a corresponding portion of an interior of the casing 40A so as to record information on the DP bag in ink. The DP bag information recording portion 78 is connected to the controller 48, and records the predetermined information on the DSP bag 76 in accordance with an instruction from the controller 48.

Figure 8:
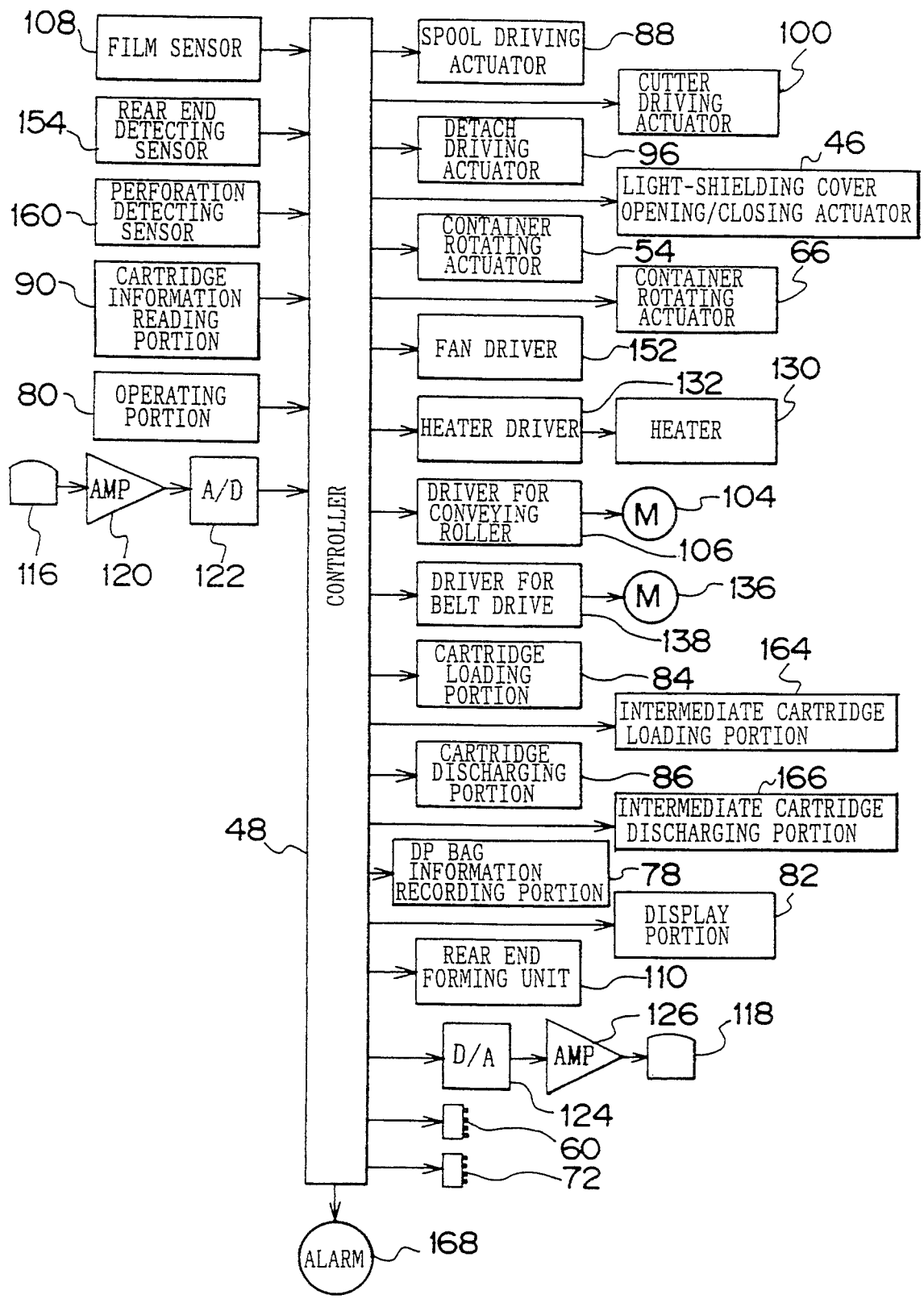
FIG. 8 is a schematic block diagram illustrating peripheral connecting relationships of a controller of the photosensitive material handling apparatus.

An operating portion 80, which has a plurality of switches for giving various types of instructions to the photosensitive material handling apparatus 40, and a display portion 82, which includes a liquid crystal display or the like, are provided above the loading portion 52. As shown in FIG. 8, the operating portion 80 and the display portion 82 are connected to the controller 48. The display portion 82 displays predetermined character information such as messages or the like in accordance with an instruction from the controller 48.

Figure 7:
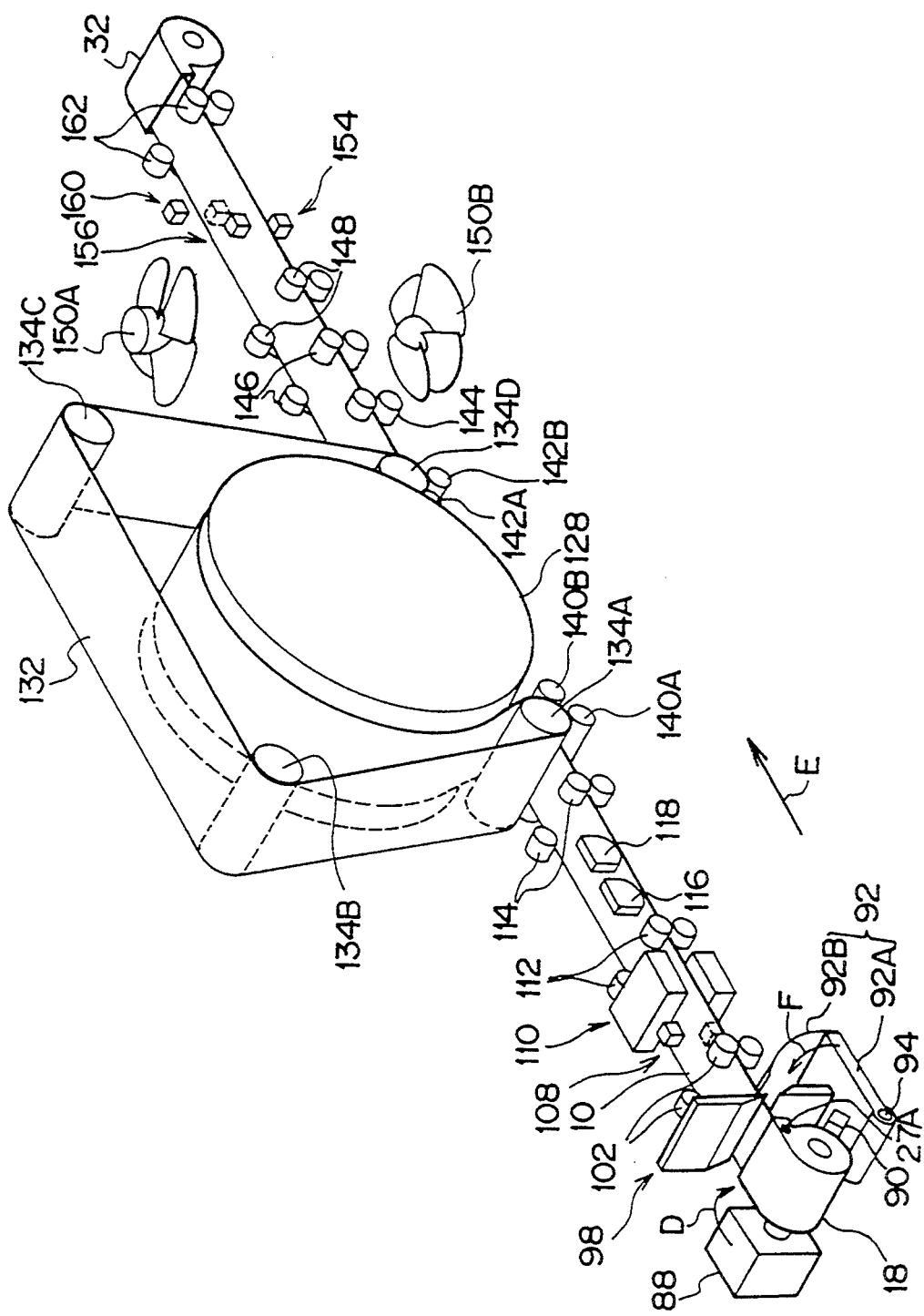
FIG. 7 is a perspective view illustrating a structure of main portions of the photosensitive material handling apparatus.

Meanwhile, the cartridge 18, which is inserted into the photosensitive material handling apparatus 40 via the opening 42A, is delivered to a cartridge loading portion 84 (see FIG. 8) and set in a processing position (left side of FIG. 7). In addition, the cartridge 18, which has been processed, is taken from the previously-described processing position by a cartridge discharging portion 86 (see FIG. 8) and fed into the circular hole 50A of the container 50. The cartridge loading portion 84 and the cartridge discharging portion 86 are connected to the controller 48 and effect the previously-described operation in accordance with an instruction from the controller 48.

A spool driving actuator 88 is disposed at a position corresponding to the spool 22 of the cartridge 18 in a state in which the cartridge 18 is set at a processing position. The spool driving actuator 88 is connected to the controller 48 (see FIG. 8) and rotates the spool 22 of the cartridge 18 in the direction of arrow D in FIG. 7 or the opposite direction in accordance with an instruction from the controller 48. In addition, an unillustrated driving portion is provided in a vicinity of the processing position so as to rotate the cam 27 via the exposing portion 27A of the cartridge 18 (see FIG. 2A). When the cam is rotated to a position in which the opening 26 is opened and the spool 22 is rotated in the direction of arrow D, the film 10, which is accommodated within the cartridge 18, is withdrawn from the cartridge 18. Then, the film 10 is held by conveying roller pairs, which will be described later, and conveyed in the direction of arrow E in FIG. 7 (hereinafter, "film conveying direction").

Figure 9:
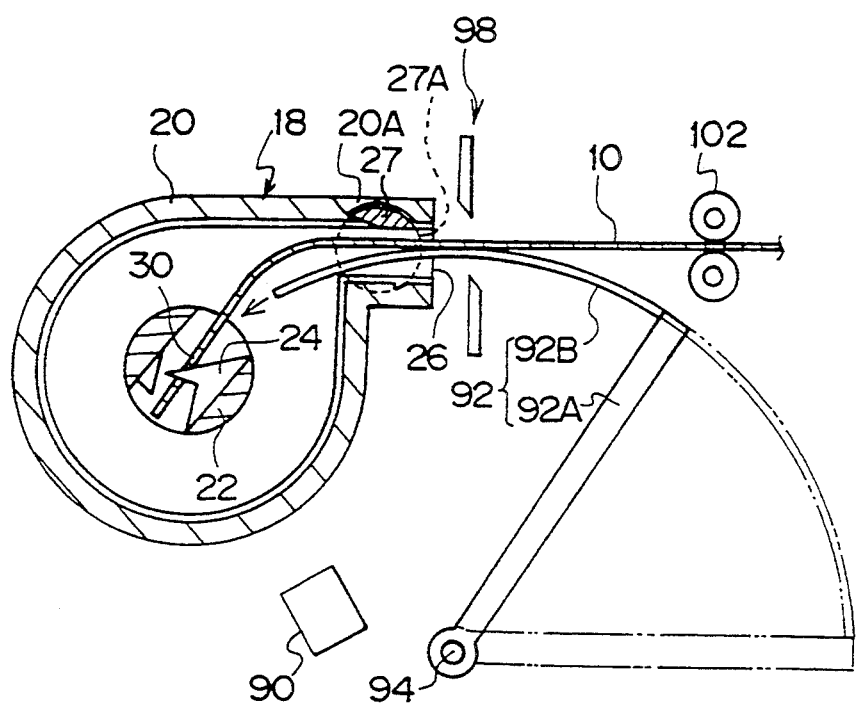
FIG. 9 is a schematic diagram describing an active state of a detach plate.

Moreover, a cartridge information reading portion 90 is provided diagonally below the previously-described processing position (see also FIG. 9). The cartridge information reading portion 90 can read a bar code recorded on the cartridge 18, which is set at the processing position. The cartridge information reading portion 90 is connected to the controller 48 (see FIG. 8) and outputs the read information to the controller 48.

A detach plate 92 is disposed diagonally below the cartridge information reading portion 90. As shown in FIG. 9, the detach plate 92 is Formed by a base portion 92A, which is pivotably supported by a pin 94, and a arc-shaped portion 92B, which is mounted to a leading end portion of the base portion 92A and curved in the form of an arc. The detach plate 92 is rotated by a detach driving actuator 96 (see FIG. 8) in the direction of arrow F in FIG. 7 and the opposite direction. The detach plate 92 is rotated in the direction of arrow F in a state in which the film 10 is withdrawn to the necessary length from the cartridge 18. Here, as shown in a solid line in FIG. 9, the leading end portion of the arc-shaped portion 92B enters the interior of the cartridge 18 from beneath the film 10 via the opening 26 so that the engagement between the rear end portion of the film 10 and the spool 22 can be released.

On the other hand, a cutter portion 98 is provided in a vicinity of the opening 26 of the cartridge 18, which is at the processing position. The cutter portion 98 includes a pair of opposing cutter blades in which the film conveying path is disposed therebetween. The cutter portion 98 is driven by a cutter driving actuator 100 (see FIG. 8) and cuts the film 10 along the transverse direction of the film 10. On the downstream side of the cutter portion 98 in the film conveying direction, two pairs of conveying roller pairs 102, which hold the vicinity of the transverse direction end portions of the film 10, are disposed along the transverse direction of the film 10. The driving force of a pulse motor 104 is transmitted to the conveying roller pairs 102 so as to be rotated. The conveying roller pairs 102 convey the film 10 to the downstream side of the film conveying direction. The pulse motor 104 is connected to the controller 48 via a driver 106 and is driven in accordance with an instruction from the controller 48.

A film sensor 108 is provided on a downstream side of the conveying roller pairs 102. The film sensor 108 is connected to the controller 48 (see FIG. 8). The film sensor 108 is formed by a pair of light-emitting elements and light-receiving elements, in which the film conveying path is opposingly disposed therebetween. The light-emitting element can emit light of a wavelength in an infrared region which does not sensitize or expose the film 10. The light-receiving element can detect light of the above-described wavelength. In a case in which the film 10 is not between the light-emitting element and the light-receiving element, an amount of light received by the light-receiving element is large. In a case in which the film 10 is therebetween, the amount of light received by the light-receiving element is small. Based on the level of signals outputted from the light-receiving element 108, the controller 48 determines whether the film 10 exists at a disposing position of the film sensor 108.

A rear end forming unit 110 is provided on a downstream side of the film sensor 108. The rear end forming unit 110 is formed by a male shape and a female shape, in which the film conveying path is disposed therebetween. The rear end forming unit 110 includes a cutter edge which forms the end portion of the film 10 as shown in FIG. 3. The rear end forming unit 110 is connected to and operated by the controller 48 (see FIG. 8), and the rear end of the film 10 is formed into the shape shown in FIG. 3. Conveying roller pairs 112 whose structure is similar to that of the conveying roller pairs 102 are provided on the downstream side of the rear end forming unit 110. Conveying roller pairs 114 whose structure is similar to that of the conveying roller pairs 102 are provided on a downstream side of the conveying roller pairs 112 at a predetermined distance. The driving force of the pulse motor 104 is transmitted to the conveying roller pairs 112 and 114 so as rotate and convey the film 10.

A reading head 116 and a recording head 118 are provided between the conveying roller pairs 112 and the conveying roller pairs 114 in accordance with the magnetic tracks of the film 10. As shown in FIG. 8, the reading head 116 is connected to the controller 48 via an amplifier 120 and an A/D converter 122. The information recorded on the magnetic tracks is read by the reading head 116. The information is then converted into digital data and outputted to the controller 48. The controller 48 is connected to the recording head 118 via a D/A converter 124 and an amplifier 128. The recorded data outputted from the controller 48 is converted into an analog signal and recorded on the magnetic track.

A large-diameter heat roller 128 is provided on a downstream side of the conveying roller pairs 114. The heat roller 128 is heated by a heater 130 (see FIG. 8). The heater 130 is connected to the controller 48 via a heater driver 133. An unillustrated sensor which detects a surface temperature of the heat roller 128 is connected to the heater driver 133. When the controller 48 instructs the heater 130 to turn on, the passage of electricity is controlled so that the surface temperature is set at a predetermined temperature. An endless belt 132 is trained around a large portion of an outer circumference of the heat roller 128. The belt 132 is also trained around four conveying rollers 134A, 134B, 134C and 134D which are disposed at an outer circumference of the heat roller 128.

A driving force of a motor 136 is transmitted to the conveying rollers 134A through 134D so as to rotate. When the conveying rollers 134A through 134D rotate, the belt 132 is moved. Accordingly, the heat roller 128, around which the belt 132 is trained, is rotated. The motor 136 connected to the controller 48 via a driver 138 and is driven in accordance with an instruction from the controller 48. Thereafter, the motor 136 moves the belt 132 and rotates the heat roller 128.

On the other hand, the film 10, which passes through the disposing position of the conveying roller pairs 114, is nipped by rollers 140A, 140B, which are disposed beneath the conveying roller 134A, and the belt 132 which is trained around the conveying roller 134A. The film 10 is guided to the outer circumference of the heat roller 128 and pressed to the outer circumferential surface of the heat roller 128 so as to be heated. The film 10 is conveyed by movement of the belt 132 and rotation of the heat roller 128. The film 10, which has reached the disposing position of the conveying roller 134D, is peeled from the outer circumferential surface of the heat roller 128 by an unillustrated peeling guide. The film 10 is held by rollers 142A, 142B, which are disposed beneath the conveying roller 134D, and the belt 132 and fed to the downstream side.

Conveying roller pairs 144 whose structure is similar to that of the conveying roller pairs 102 are provided on the downstream side of the disposing position of the conveying roller 134D. In addition, conveying roller pairs 146 and 148 are provided on a downstream side of the conveying roller pairs 144 at respective predetermined distances. At the disposing positions of the conveying roller pairs 144, 146, and 148, cooling fans 150A and 150B are respectively provided above and below the film conveying path. The cooling fans 150A and 150B which are driven so as to rotate by a fan driver 152 blow air onto the film 10 which is conveyed along the film conveying path. Accordingly, the film 10 is cooled. The fan driver 152 is connected to the controller 48, and drives so as to rotate the cooling fans 150A and 150B in accordance with an instruction from the controller 48.

A rear end detecting sensor 154 whose structure is similar to that of the aforementioned film sensor 108 is provided on a downstream side of a disposing position of the conveying roller pairs 148. The rear end detecting sensor 154 is connected to the controller 48 (see FIG. 8). In addition, on the downstream side of the disposing position of the rear end detecting sensor 154, a perforation detecting sensor 160 whose structure is similar to that of the film sensor 108 is provided at a position corresponding to the perforations 12, 14 and 16 (see FIG. 1), which are provided in the film 10. The perforation detecting sensor 160 is also connected to the controller 48. On a downstream side of the perforation detecting sensor 160, conveying roller pairs 162 whose structure is similar to that of the conveying roller pairs 102 are provided. Further, the intermediate cartridge 32 is disposed on the downstream side of the disposing position off the conveying roller pairs 162.

Figure 13A:
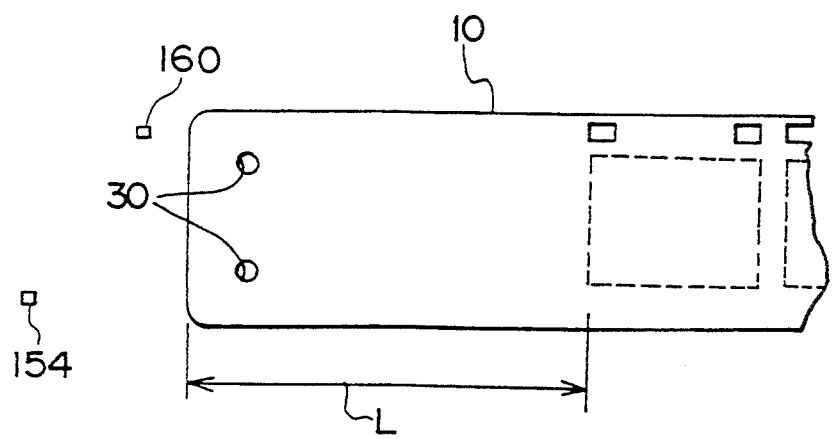
FIG. 13A is a plan view illustrating the rear end portion of the film.

As illustrated in FIGS. 13A and 18B, given that a distance between the rear end detecting sensor 154 and the intermediate cartridge 86 is D1, a width of the light-shielding cloth 36 is S, a distance between the rear end of the film 10 and the end portion of the rear end side of the image 10A is L, a position of the rear end detecting sensor 154 is determined by the following formula (1).

$$D1+S<L \tag{1}$$

Accordingly, if the film 10 is accommodated within the intermediate cartridge 32 until a state in which the rear end of the film 10 is located at a disposing position of the rear end detecting sensor 154, the entire recording portions of the images 10A, which are recorded on the film 10, are accommodated within the intermediate cartridge 32.

The processing position of the intermediate cartridge 32 is shown in FIG. 7. The intermediate cartridge 32, which is inserted into the photosensitive material handling apparatus 40 via the opening 42B, is delivered to an intermediate cartridge loading portion 164 (see FIG. 8) and set in the above-described processing position. The intermediate cartridge 32, which has completed the process, is taken from the previously-described processing position by an intermediate cartridge discharging portion 166 (see FIG. 8) and fed into the circular hole 62A of the container 62. The intermediate cartridge loading portion 164 and the intermediate cartridge discharging portion 166 are connected to the controller 48 and effect the previously-described operation in accordance with an instruction from the controller 48.

In addition, the controller 48 is formed with a microcomputer or the like. An alarm 168 is connected to the controller 48. If anything goes wrong, the controller 48 operates the previously-described alarm 168 and informs the operator.

Figure 10:
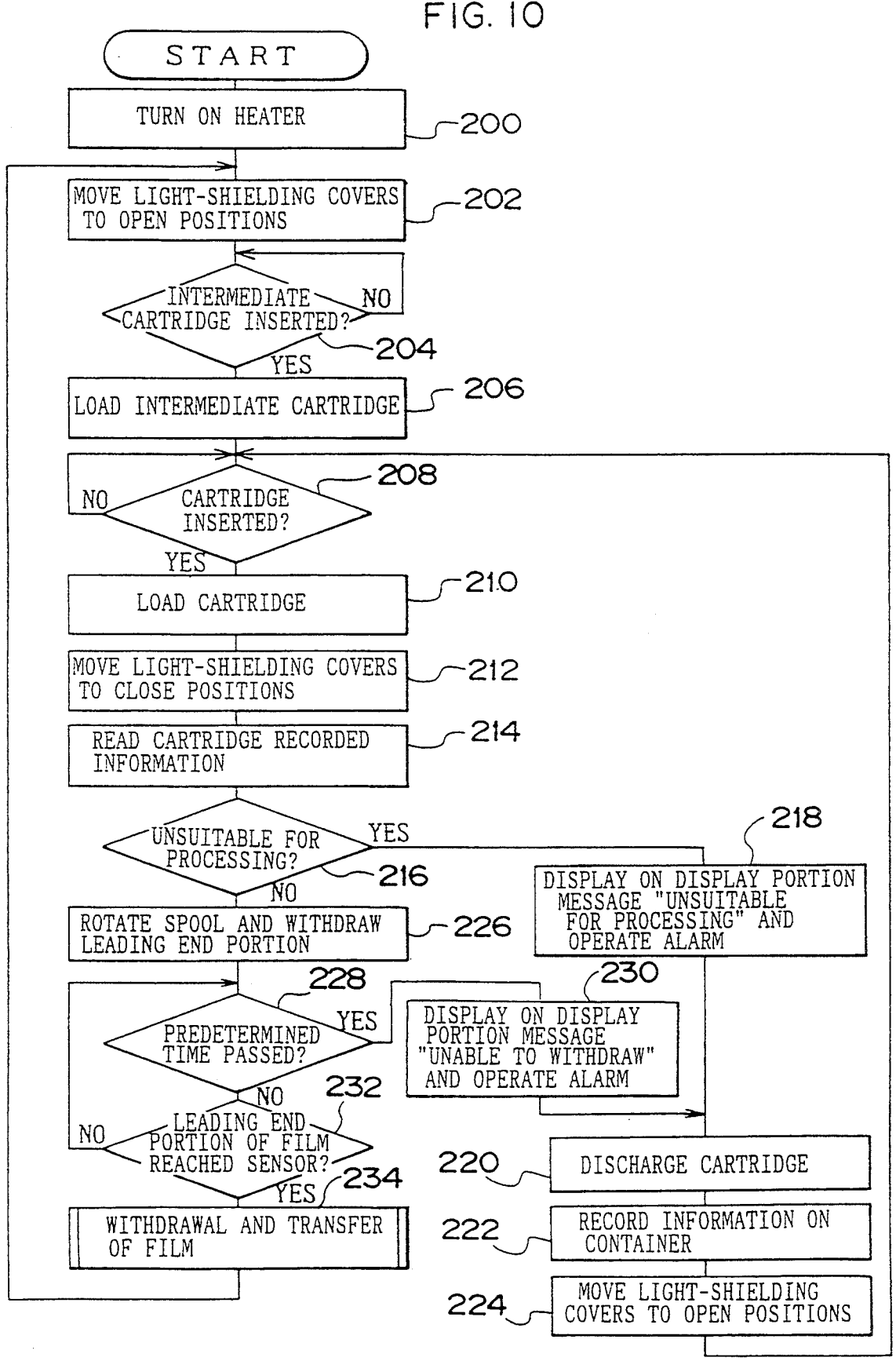
FIG. 10 is a flowchart explaining an operation of the present embodiment.

Next, the operation of the photosensitive material handling apparatus 40 relating to the present embodiment will be described with reference to the flowchart in FIG. 10. The flowchart in FIG. 10 is performed when a power source of the photosensitive material handling apparatus 40 is on and the container 50, the container 62, the memory card 70 and the DP bag 76 are respectively loaded into the loading portion 52, the loading portion 64, the memory card loading portion 68 and the DP bag loading portion 76.

First, in step 200, the heater driver 133 instructs the heater 130 to turn on and starts heating the heat roller 128. In a subsequent step 202, the light-shielding covers 44A and 44b are slid by the light-shielding cover opening/closing actuator 4S8 to positions in which the openings 42A and 42B are respectively opened. Accordingly, the cartridge 18 and the intermediate cartridge 32 can be inserted into the photosensitive material handling apparatus 40.

In step 204, a determination is made as to whether the intermediate cartridge 32 has been inserted into the photosensitive material handling apparatus 40 via the opening 42B. If the intermediate cartridge 32 has been inserted by the operator, the answer to the determination in step 204 is "Yes". In subsequent step 206, the inserted intermediate cartridge 32 is set in a processing position (the position shown on the right side in FIG. 7) by the intermediate cartridge loading portion 164. Further, in step 208, a determination is made as to whether the cartridge 18 has been inserted into the photosensitive material handling apparatus 40 via the opening 42A. If the cartridge 18 has been inserted by the operator, the answer to the determination in step 208 is "Yes". In step 210, the inserted cartridge 18 is set at a processing position (the position shown on the left side in FIG. 7) by the cartridge loading portion 84.

When the insertions of the cartridge 18 and the intermediate cartridge 32 are completed, in step 212 the light-shielding covers 44A and 44B are slid by the light-shielding cover opening/closing actuator 46 to positions in which the openings 42A and 42B are respectively closed. Accordingly, the interior of the photosensitive material handling apparatus 40 becomes dark. In step 214, the cartridge information reading portion 90 reads the bar code which is recorded on the cartridge 18 and stores the read information.

In step 216, based on the information read from the cartridge 18, a determination is made as to whether the film 10, which is accommodated within the cartridge 18, is an unsuitable film to be processed by the photosensitive material handling apparatus 40. The film 10, which is processed by the photosensitive material handling apparatus 40, will be developed by a film processor. Consequently, if, for example, images of the film 10 are not shot and the film 10 is not exposed, or the film 10 has been developed, the film 10 is determined to be unsuitable for processing and the answer to the previously-described determination is "Yes".

When the answer to the determination in step 216 is "Yes", the process moves to step 218. In step 218, the alarm 168 is operated so as to inform the operator that ordinary processing cannot be effected. In addition, the display portion 82 displays a message that "the film is unsuitable for processing" and the reasons why the film is unsuitable. In a subsequent step 220, the cartridge 18, which accommodates the film 10 determined to be unsuitable for the above-described process, is discharged by the cartridge discharging portion 86 and accommodated within the circular hole 50A, which corresponds to the cartridge discharging portion 86, of the container 50. In step 222, the information such as identification information of the cartridge 18 and the reasons why the film is unsuitable for processing are stored in the storing device 56 of the container 50 so as to correspond to the information about the position of the circular hole 50A, which accommodated the previously-described cartridge 18.

In a subsequent step 224, the light-shielding cover 44A is slid by the light-shielding cover opening/closing actuator 46 so as to open the opening 42A, and thereafter, the process returns to step 208. Accordingly, the cartridge 18 for subsequent processing can be inserted.

On the other hand, if the film 10, which is accommodated within the cartridge 18 is determined to be a suitable film for processing and the answer to the determination in step 216 is "No", the process moves to step 226. In step 226, the cam 27 is rotated to a position in which the opening 26 of the cartridge 18 is opened by the driving portion, and thereafter, the spool 22 of the cartridge 18 is started to rotate by the spook driving actuator 88 so as to withdraw the leading end portion of the film from the cartridge 18. In step 228, a determination is made as to whether a predetermined time has passed since the spool 22 started to rotate.

If the answer to the determination in step 228 is "No", in step 232 a determination is made as to whether the leading end portion of the film 10 has reached the disposing position of the film sensor 108. When the leading end portion of the film 10 has reached the disposing position of the film sensor 108 and held between the light-emitting element and the light-receiving element, the amount of light received by the light-receiving element is reduced and the signal outputted from the light-receiving element becomes low. Thus, the above-described determination is made by determining whether the output signal becomes low. If the answer to the determination in step 232 is "No", the process returns to step 228, and the rotation of the spool 22 continues until the answer to the determination in step 228 or step 232 becomes "Yes".

If the leading end portion of the film 10 has not been detected even after the predetermined time has passed, the answer to the determination in step 228 is "Yes". The process moves to step 230 where the alarm 168 is operated so as to inform the operator that the film 10 cannot be withdrawn from the cartridge 18, and the display portion 82 displays a message "unable to withdraw". After processing step 230, the process moves to step 220 where the cam 27 is rotated by the driving portion, the opening 26 is shielded, and thereafter, the cartridge 18 is discharged as described above. The information is then stored in the storing device 56 of the container 50 and the opening 42A is opened.

On the other hand, if the leading end portion of the film 10 has been detected within the predetermined time, withdrawal and transfer of the film 10 are effected. The withdrawal and transfer of the film will be described in detail with reference to the flowchart in FIG. 11.

Figure 11:
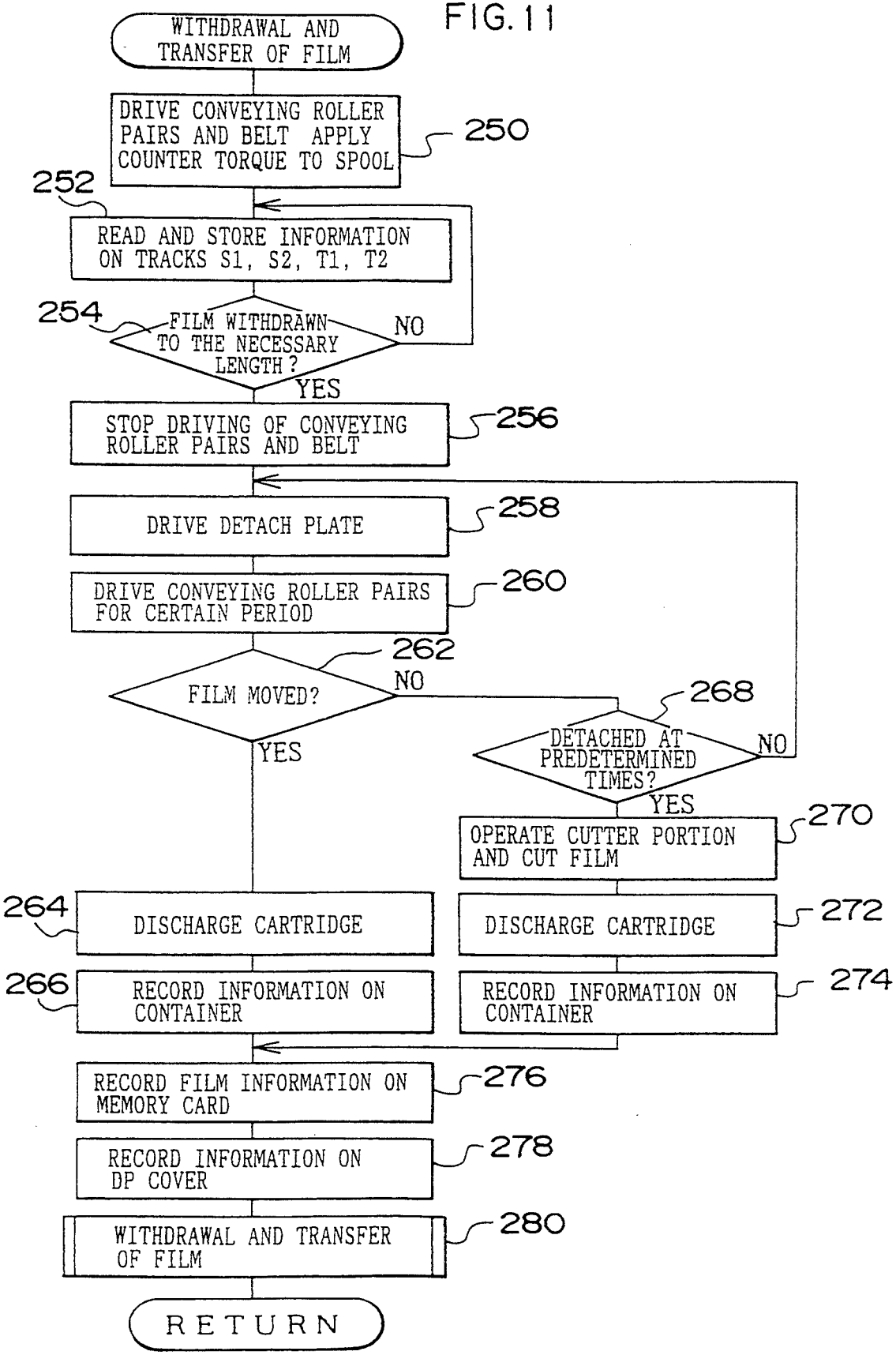
FIG. 11 is a flowchart explaining withdrawal and transfer processes of the film.

In step 250 in FIG. 11, the pulse motor 104 is driven by the driver 106 so as to rotate the conveying roller pairs 102, 112, 114, 144, 146, 148 and 162. The motor 136 is driven and the belt 132 is moved by the driver 138 so as to rotate the heat roller 128. In addition, torque is applied to the spool 22 by the spool driving actuator 88 in the winding direction of the film 10. Accordingly, the film 10 is withdrawn from the cartridge 18 and conveyed with a predetermined tension applied thereto. Further, in step 250, the cooling fans 150A and 150B are rotated by the fan driver 152.

With the withdrawal and conveyance of the film 10, in subsequent step 252, the film information and the shooting information, which are magnetically recorded on the tracks S1, S2, T1 and T2 of the film 10, are read by the reading head 116. The read information is stored in an unillustrated storing device. On the other hand, the film 10, which is withdrawn from the cartridge 18, is successively conveyed on the downstream side, and trained around the heat roller 128 so as to be heated. The set temperature of the heat roller is more than or equal to the temperature corresponding to a glass transition point of the base material of the film 10, and the heater 130 is controlled by the heater driver 132 so that the surface temperature of the heat roller 128 is kept at the set temperature. Accordingly, the film 10 which is trained around the heat roller 128 is continuously heated at the above-described set temperature for a certain period of time.

Further, the film 10 which has passed the disposing position of the heat roller 128 is nipped by the conveying roller pairs 144, 146 and 148 and conveyed linearly. Air is blown onto the film 10 by the cooling fans 150A and 150B so that the film 10 is cooled to a degree that is less than or equal to the temperature corresponding to the previously-described glass transition point. The film 10 continues to be conveyed linearly. Because the film 10 is always kept in a state in which the film 10 is taken up into the cartridge 18 by the spool 22, the film 10 develops a tendency to bend in a certain direction while the film 10 is free, i.e., a curling tendency. The curling tendency creates conveying drawbacks when the film 10 is processed in the various types of photographic processing apparatuses. However, when the film 10 is cooled after the film 10 is temporarily heated by the heat roller 128 as described above, the curling tendency of the film 10 is corrected.

Moreover, the film 10, which has passed the disposing position of the conveying roller pairs 162, is fed into the intermediate cartridge 82 via the opening 34. With the conveyance of the film 10, the film 10 is gradually trained around the circumference of the spool 32A and accommodated within the intermediate cartridge 32.

In a subsequent step 254, a determination is made as to whether the film 10 has been withdrawn to the necessary length from the cartridge 18. This is determined by determining whether the movement of the film 10 has stopped. While the answer is being determined in step 254 as "No", the information is continuously read from the film 10 in step 252. When the answer to the determination in step 254 is "Yes", in step 256 the drivings of the pulse motor 104 and the motor 136 are stopped, the rotation of the respective conveying roller pairs is stopped, and the movement of the belt 132 is stopped.

From subsequent step 258 on, separation (hereinafter, "detach") of the film 10 and the cartridge 18 is effected. Namely, in step 258, the detach plate 92 is temporarily rotated by the detach driving actuator 96 in the direction of arrow F in FIG. 7, and thereafter, is returned (rotated in the opposite direction) to the original position. Consequently, the leading end portion of the arc-shaped portion 92B of the detach plate 92 is inserted into the cartridge 18 so as to release the engagement between the projection 24, which is provided on the spool 22 of the cartridge 18, and the holes 30, which are provided in the rear end portion of the film 10.

In step 260, the pulse motor 104 is driven and rotates the conveying roller pairs 102 for a certain period of time in the withdrawing direction of the film 10. In step 262, by determining whether the film 10 has moved, a determination is made as to whether detaching has been successful. If the engagement between the projection 24 of the spool 22 and the holes 30 of the film 10 is released due to the process in step 258 and detaching has been successful, the answer to the determination in step 262 is "Yes". In step 264, the successful cartridge 18 is discharged by the cartridge discharging portion 86 and accommodated within the circular hole 50A, which corresponds to the cartridge discharging portion 86, of the container 50. In step 266, identification information of the cartridge 18 or the like is stored in the storing device 56 of the container 50 so as to correspond to the information about the position of the circular hole 50A which accommodated the previously-described cartridge 18. The process then moves to step 276.

On the other hand, if the answer to the determination in step 262 is "No", the determination is made that detaching has failed. In step 268, a determination is made as to whether the detaching operation is performed at predetermined times. If the answer to the determination in step 268 is "No", the process returns to step 258, and repeats steps 258 through 262 and step 268. In a case in which the detaching has failed even though the detaching operation is performed at predetermined times, the answer to the determination in step 268 is "Yes" and the process moves to step 270.

In step 270, the cutter portion 98 is operated by the cutter driving actuator 100 so as to cut the film 10 along the transverse direction thereof. In step 272, the cartridge 18 is discharged by the cartridge discharging portion 86 and is accommodated within the circular hole 50A, which corresponds to the cartridge discharging portion 86, of the container 50. In step 274, the identification information of the cartridge 18 and the information, which describes that the rear end portion of the film 10 remains within the cartridge 18, are stored in the storing device 56 of the container 50 so as to correspond to the information about the position of the circular hole 50A, which accommodated the previously-described cartridge 18. The process then moves to step 276.

The above-described rear end portion must be later removed in a case in which the rear end portion of the film 10 remains within the cartridge 18. Consequently, in order to facilitate the removal, it is preferable that the film 10 be cut at the position from the opening of the cartridge 18 by a certain distance.

In step 276, information which is read from the respective tracks of the film 10, such as the film information and the shooting information, is stored in the memory card 70, which is loaded into the memory card loading portion 68, so as to correspond to the cartridge identification information. The memory card 70 is used in the existing photographic processing system, and is mounted to the photographic printing apparatus or the like when the images which are recorded on the film 10 are printed by an unillustrated photographic printing apparatus. Consequently, even if means for reading the magnetic information is not newly provided for the previously-described photographic printing apparatus, a process of determining printing conditions or the like can be effected by using the shooting information or the like recorded on the memory card 70. Processing time for the photographic printing apparatus or the like can be also reduced.

In step 278, information such as the cartridge identification information or the like is recorded on the DP bag 76 by the DP bag information recording portion 78. Transfer of the film will be described in detail with reference to the flowchart in FIG. 12.

Figure 12:
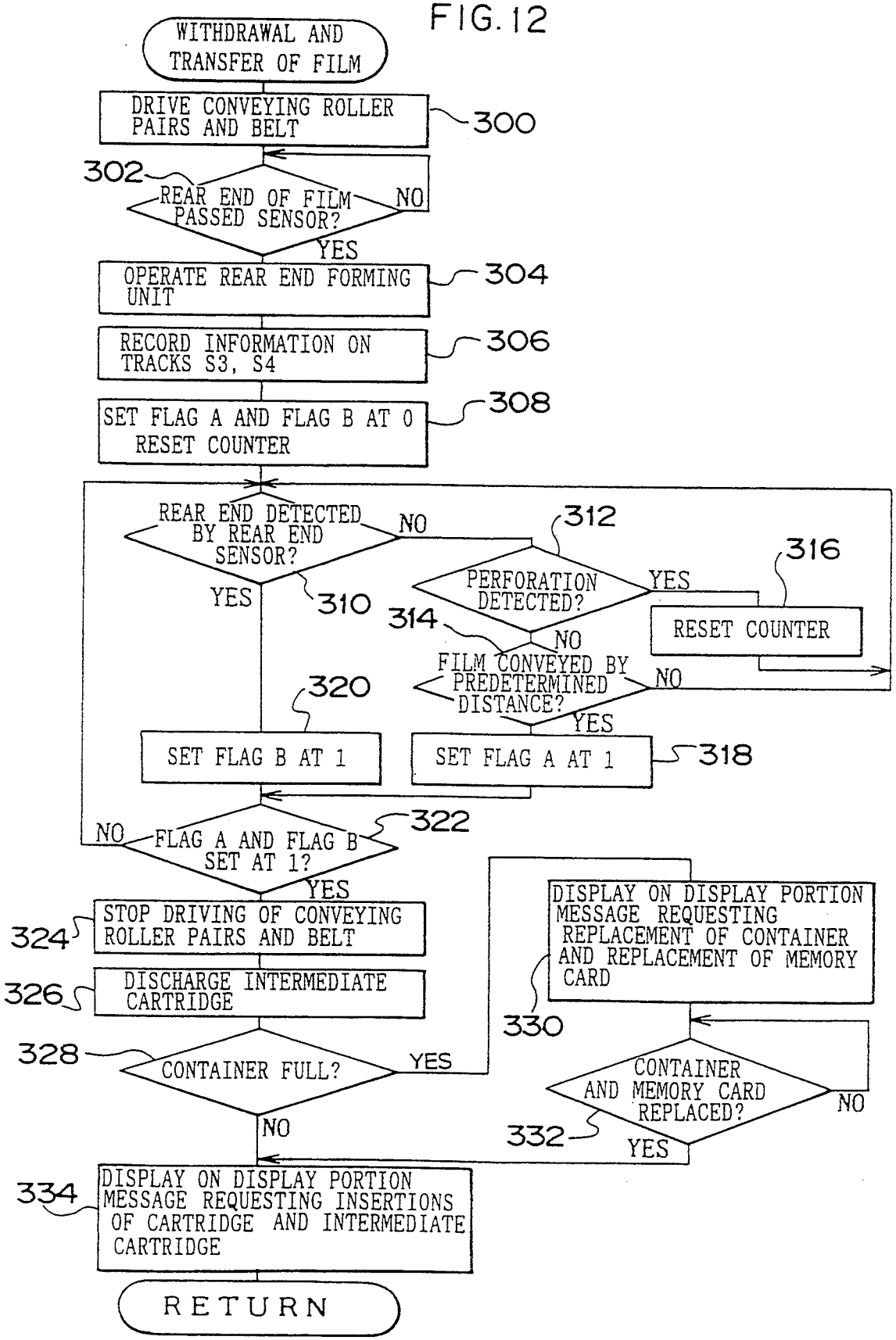
FIG. 12 is a Flowchart explaining a transfer process of the film.

In step 300 in FIG. 12, the pulse motor 104 is driven so as to rotate the respective conveying roller pairs, the motor 136 is driven so as to move the belt 132 and rotate the heat roller 128. Thereafter, the transfer of the film 10, whose rear end becomes free, starts. In subsequent step 302, a determination is made as to whether the rear end portion of the film 10 has passed the disposing position of the film sensor 108. When the rear end portion of the film 10 has passed the disposing position of the film sensor 108, the film 10 does not exist between the light-emitting element and the light-receiving element, the amount of light received by the light-receiving element is increased and the output signal becomes high. Accordingly, the above-described determination can be made by determining whether the output signal from the light-receiving element becomes high.

If the answer to the determination in step 302 is "Yes", in step 304 the rear end forming unit 110 is operated so as to round the corner portions at the rear end of the film 10 as shown in FIG. 3 and punch the holes 30. Consequently, when all of the processes such as developing, printing and the like are completed and the film 10 is transferred to the cartridge 18 for returning the film 10 to a user, the rear end portion (the leading end portion after the film 10 is transferred to the intermediate cartridge 32) of the film 10 can be easily engaged with the projection 24 of the spool 22.

In step 306, when the tracks S3 and S4, which are provided at the rear end of the film 10, correspond to the recording head 118, the film information and the cartridge identification information are recorded on the tracks S3 and S4 by the recording head 118. Accordingly, the cartridge identification information which is recorded on the cartridge 18 is respectively recorded on the storing device 56 of the container 50, the DP bag 76 and the film 10. Therefore, by making the cartridge identification information as a key, when the film 10 is returned to the user, the cartridge 18, the film 10 and the DP bag 76 can be easily checked so as to correspond to one another.

Next, in steps 310 through 322, a rear end detecting process of the film 10 is effected. Namely, in step 308, areas for flags provided in the memory, "flag A" and "flag B", are previously set at "0". In addition, the driver 106 includes a counter for counting the number of pulses of the driving electricity of the pulse motor 104. In this step 308, a count value of the above-described counter is reset.

Figure 13B:
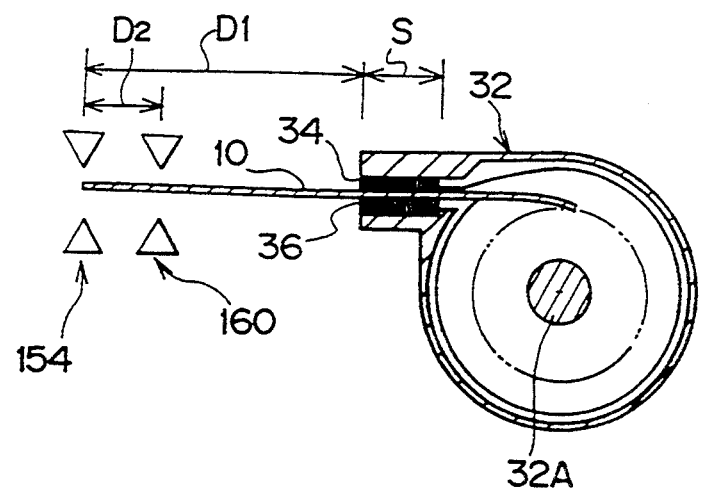
FIG. 13B is a schematic diagram illustrating positional relationships among the intermediate cartridge, a rear end detecting sensor, and a perforation detecting sensor.

In step 310, a determination is made as to whether the rear end detecting sensor 154 has detected the rear end of the film 10. If the answer to the determination in step 310 is "No", in step 312 a determination is made as to whether the perforation detecting sensor 160 has detected the perforations provided in the film 10. If the answer to the determination in step 312 is "No", based on the count value of the previously-described counter, a determination is made as to whether the film 10 has been conveyed by a predetermined distance X in step 314. Given that the distance between the rear end detecting sensor 154 and the perforation detecting sensor 160 is D2 as shown in FIG. 13B, the predetermined distance X is determined by the following formula (2).

$$X > L - D2 \qquad (2)$$

Therefore, if the film 10 is conveyed until the above described formula (2) is satisfied, the entire recording portions of the images 10A, which are recorded on the film 10, are accommodated within the intermediate cartridge 32. In a case in which the answer to the determination in step 314 is "No", the process returns to step 310 and repeats the determinations of steps 310, 312 and 314.

If the perforation detecting sensor 160 detects the perforations, the answer to the determination in step 312 is "Yes". In step 316, the count value of the previously-described counter is reset and the process returns to step 310. Because the count value of the previously-described counter is reset when a new perforation is detected, the count value of the previously-described counter corresponds to the conveying distance of the film 10 after the last perforation is detected.

On the other hand, when the rear end is detected by the rear end detecting sensor 154, the answer to the determination in step 310 is "Yes". After the flag A is set at "1" in step 320, a determination is made as to whether both flag A and flag B are set at "1" in step 322. If the answer to the determination in step 322 is "No", the process returns to step 310. In addition, if the perforation is not detected even if the film 10 is conveyed more than or equal to the predetermined distance after the last perforation is detected, the answer to the determination in step 314 is "Yes". In step 318, the flag B is set at "1" and the process moves to step 322. If the answer to the determination in step 322 is "Yes", in step 324 the drivings of the pulse motor 104 and the motor 136 are stopped and the conveyance of the film 10 is stopped.

Accordingly, conveyance of the film 10 is stopped in a state in which the rear end off the film 10 is projected from the intermediate cartridge 32 by the predetermined amount. It does not matter which determination comes first regarding the positive answers to the determinations in step 310 and step 314. However, the conveyance of the film 10 cannot be stopped unless both the formula (1) and the formula (2) are satisfied and both the flag A and the flag B are "1". Consequently, inconveniences do not occur due to, for example, wrong detection or failure of the sensor or the like in which the conveyance of the film 10 is stopped in a state in which the portion, on which the images 10A of the film 10 are recorded, is not accommodated within the intermediate cartridge 32 and the previously-described images 10A are lost or the like.

In step 326, the intermediate cartridge discharging portion 166 is operated so as to discharge the intermediate cartridge 32 which has completed the winding of the film 10. The intermediate cartridge 32 is accommodated within the circular hole 62A, which corresponds to the intermediate cartridge discharging portion 166, of the container 62. The end portion of the film 10, which is projected from the intermediate cartridge 32, is trained around the outer circumference of the intermediate cartridge 32 by the intermediate cartridge discharging portion 166. Accordingly, the transfer of the film 10, which is accommodated within the single cartridge 18, to the intermediate cartridge 32 is completed. The process then moves to step 328.

In step 328, a determination is made as to whether the container 50 or the container 62 is full. Namely, a determination is made as to whether the cartridges 18 are accommodated within all of the circular holes 50A of the container 50, and whether the intermediate cartridges 32 are accommodated within all of the circular holes 62A of the container 62. In a case in which the answer to the determination in step 328 is "No", the process moves to step 334. In a case in which the answer to the determination is "Yes", the process moves to step 330 and the display portion 82 displays the message which requests replacement of the containers.

In a case in which the container 62, which accommodates the intermediate cartridge 32, needs to be replaced, a message, which requests replacement of the memory card 70, is also displayed. In the latter-stage apparatus (e.g., the photographic printing apparatus) of the photosensitive material handling apparatus 40, based on the information recorded on the memory card 70, a plurality of intermediate cartridges 32, which are accommodated within the single container 62, are processed as one unit. Consequently, the memory card 70 corresponds one to one with the container 62, and the entire information relating to the film 10, which is accommodated within the single container 62, is recorded on the memory card 70. Therefore, if the container 62 is replaced, the memory card 70 is also replaced.

In subsequent step 332, a determination is made as to whether the container which requested the replacement has been replaced. In addition, if the filled container is the container 62 which accommodates the intermediate cartridge 32, a determination is made as to whether the memory card 70 has been also replaced. When the containers (and the memory card) have been replaced, the answer to the determination in step 332 is "Yes" and the process moves to step 334.

In step 334, the display portion 82 displays a message which requests the replacements of the cartridge 18, the intermediate cartridge 32 and the DP bag 76. The containers 50 and 64 are rotated so that, among the plurality of circular holes 50A and 62A which are respectively provided at the containers 50 and 62, the circular holes, which do not accommodate a cartridge 18 and an intermediate cartridge 32, correspond to the cartridge discharging portion 166. When the processing in step 334 has been completed, the process returns to the step 202 of flowchart in FIG. 10 and repeats the above-described processings.

As described above, the film 10, which has been transferred to the intermediate cartridge 32, is developed by the film processor, and thereafter, the images are detected. In addition, in a case in which a negative film is simultaneously printed, the images are printed on a photographic printing paper at an unillustrated photographic printing apparatus and processed. When all the processes have been completed, the aforementioned checking is performed. The film 10 is rewound into the cartridge 18, which corresponds thereto, and accommodated within the corresponding DP bag 76, and thereafter, returned to the user.

In the present embodiment, a description was given of an example to which the perforation detecting sensor 160, which detects the perforations provided at the film 10, is applied as detecting means for detecting an indicator provided at a predetermined position of the photosensitive material. However, the present invention is not limited to the same. For example, a hole may be previously punched, or an indicator may be applied in ink or the like at a predetermined position outside of the image recording areas of the film 10 so that the punched hole or the indicator is detected by the sensor. In addition, the rear end detecting sensor 154 and the perforation detecting sensor 160 are provided as a plurality off detecting means. However, the present invention is not limited to the same. For example, a plurality of rear end detecting sensors may be arranged along the transverse direction of the film 10, and based on the detected results of the respective sensors, conveyance of the film 10 may be stopped.

In the present embodiment, the cartridge 18, the intermediate cartridge 32 and the DP bag 76 are manually set at the photosensitive material handling apparatus 40. However, the present invention is not limited to the same. The cartridge 18, the intermediate cartridge 32 and the DP bag 76 may be stacked in a stacking device or the like and automatically supplied to the apparatus 40.

In the present embodiment, a determination as to whether the film 10 has been developed is made by reading the recorded bar code. The present invention is not limited to the same, and the determination may be made by measuring the light transmittance rate of the film 10 which is withdrawn from the cartridge 18.

Further, in the present embodiment, in a case in which the film 10 which is accommodated within the cartridge 18 is an unsuitable film for processing, and in a case in which the film 10 cannot be withdrawn from the cartridge 18, a message is displayed and the information is stored in the storing device 56 of the container 50. However, the present invention is not limited to the same. The controller 48 of the photosensitive material handling apparatus 40 may be connected via LAN (local area network) to the controller such as a computer, which controls the photographic processing system, and the previously-described information may be transmitted thereto. In addition, the above-described cartridge 18 may be discharged to a container which is different from the ordinary container 50.

In the present embodiment, the information is recorded on the cartridge 18 by the bar code. However, the present invention is not limited to the same, and, for example, the information may be recorded magnetically. In addition, the previously-described information may be recorded in characters or the like so that the operator can confirm the content. By operating the operating portion 80, the operator may input the previously-described information to the photosensitive material handling apparatus 40.

Further, in the present embodiment, the information is magnetically recorded on the film 10. However, the present information is not limited to the same. For example, the information may be recorded optically as by a bar code, or the information may be recorded by punching a hole or the like. The previously-described information may be recorded in characters and inputted by the operator. Moreover, the information can be recorded on the DP bag 76 magnetically, optically, or in characters.

In the present embodiment, the cartridge identification information used for checking is recorded on the cartridge 18, and the identification information is recorded on the film 10, DP bag 76 and the storing device 56 of the container 50. The present invention is not limited to the same. For example, the previously-described information may be recorded on the DP bag 76, and then, read and recorded on the previously-described other means.

Further, in the present embodiment, passage of electricity of the heater 130 is controlled so that the surface temperature of the heat roller 128 is set at the predetermined set temperature. However, the present embodiment is not limited to the same. For example, the set temperature and/or heating time may be changed in accordance with the type of the film 10. The set temperature and/or the heating time may be changed in accordance with the strength of the curling of the film 10. The strength of the curling is determined by the manufacturing date of the film 10.

In the present embodiment, in a case in which the detach plate 92 cannot be detached, the film 10 is cut and processed. However, the film 10 may be rewound into the cartridge 18 without being cut.

Further, according to the above-description, when the film 10 is returned to the user, the film 10 is assumed to be transferred into the cartridge 18. However, the film 10 may be accommodated within the film sheets as before and returned to the user. The cartridge 18 may be reused. When the cartridge 18 is reused, based on the information recorded on the cartridge 18, the cartridge 18 can be distinguished by the manufacturer or the type of the film 10.

What is claimed is:

1. A photosensitive material handling apparatus comprising:

separating means for withdrawing an elongated photosensitive material, which has been photographically exposed, is undeveloped and is accommodated within a first cartridge, from said first cartridge in a state in which said photosensitive material is not exposed to ambient light, said separating means separating said photosensitive material from said first cartridge;

accommodating means for conveying said photosensitive material, which is separated from said first cartridge by said separating means, without exposing said photosensitive material to ambient light, and successively accommodating said photosensitive material within a second cartridge, of which an inner portion and an outer portion can be shielded from light while an end portion of said photosensitive material is exposed to the exterior of said second cartridge; and control means for stopping the conveying of said photosensitive material into said second cartridge by said accommodating means in a state in which image portions, which are recorded on said photosensitive material, are completely accommodated within said second cartridge and a rear end portion of said photosensitive material extends from said second cartridge by a predetermined length.

2. A photosensitive material handling apparatus according to claim 1, further comprising:

determining means for determining whether said photosensitive material is suitable for handling according to one of information and data relating to said photosensitive material.

3. A photosensitive material handling apparatus according to claim 2, wherein the information relating to said photosensitive material is displayed on said first cartridge, and said determining means reads said information so as to determine whether said photosensitive material is suitable for handling.

4. A photosensitive material handling apparatus according to claim 2, wherein the data relating to said photosensitive material is obtained as a result of measuring a light transmittance rate of said photosensitive material which is withdrawn from said first cartridge, and said determining means determines from said data whether said photosensitive material is suitable for handling.

5. A photosensitive material handling apparatus according to claim 2, further comprising:

first displaying and discharging means for providing a warning in a case where said determining means determines that said photosensitive material is unsuitable for handling, by effecting at least one of displaying, storing and transmitting to a general controller predetermined information, and discharging said first cartridge.

6. A photosensitive material handling apparatus according to claim 1, wherein said separating means applies tension to said photosensitive material while said separating means withdraws said photosensitive material from said first cartridge.

7. A photosensitive material handling apparatus according to claim 1, further comprising:

second displaying and discharging means for providing a warning in a case where said separating means cannot withdraw said photosensitive material from said first cartridge, by effecting at least one of displaying, storing and transmitting to the general controller the predetermined information, and discharging said first cartridge.

8. A photosensitive material handling apparatus according to claim 1, further comprising:
reading and recording means for, in order to respectively check said photosensitive material, said first cartridge and a accommodating body for accommodating said first cartridge, reading the information which is necessary for checking and is recorded on at least one of said photosensitive material, said first cartridge and said accommodating body, and for recording said information, which is necessary for checking, on at least one of said photosensitive material, said first cartridge and said accommodating body.

9. A photosensitive material handling apparatus according to claim 1, further comprising:
reading and storing means for reading and storing the information recorded on said photosensitive material.

10. A photosensitive material handling apparatus according to claim 1, further comprising:
curl removing means for making an amount of curling of said photosensitive material to be less than or equal to a certain value when said accommodating means conveys said photosensitive material.

11. A photosensitive material handling apparatus according to claim 10, wherein said curl removing means makes the amount of curling of said photosensitive material to be less than or equal to the certain value by cooling after heating said photosensitive material for at least one of temperature and time according to at least one of a type of said photosensitive material and the amount of curling of said photosensitive material.

12. A photosensitive material handling apparatus according to claim 10, wherein said curl removing means makes the amount of curling of said photosensitive material to be less than or equal to the certain value by heating said photosensitive material more than or equal to a temperature corresponding to a glass transition point of a base material, and thereafter, cooling said photosensitive material to less than or equal to the temperature corresponding to said glass transition point.

13. A photosensitive material handling apparatus according to claim 1, wherein said separating means separates said photosensitive material from said first cartridge by withdrawing said photosensitive material from said first cartridge, and thereafter, by inserting a detach member into said first cartridge.

14. A photosensitive material handling apparatus according to claim 1, wherein said separating means separates said photosensitive material from said first cartridge by withdrawing said photosensitive material from said first cartridge, and thereafter, by cutting said photosensitive material along the transverse direction of said photosensitive material.

15. A photosensitive material handling apparatus according to claim 14, wherein said separating means cuts a position of said photosensitive material separated by a certain distance from an opening of said first cartridge when said separating means cuts said photosensitive material.

16. A photosensitive material handling apparatus according to claim 1, further comprising:
a plurality of detecting means for detecting an indicator which is provided at one of an end portion of said photosensitive material and at a predetermined position of said photosensitive material, wherein
said control means respectively determines a position of the end portion of said photosensitive material based on the results detected by said plurality of detecting means, and when the end portion, which is determined by said respective detecting means, is located at the position separated by a predetermined distance from said second cartridge, said control means stops accommodation of said photosensitive material within said second cartridge by said accommodating means.

17. A photosensitive material handling apparatus according to claim 16, wherein in a case where said detecting means cannot detect said indicator which is provided at the predetermined position of said photosensitive material, when said photosensitive material is conveyed by a predetermined amount and at least one of said plurality of detecting means detects the end portion of said photosensitive material, said control means respectively determines a position of the end portion of said photosensitive material, and when the end portion, which is respectively determined by said detecting means, is located at a position separated by a predetermined distance from said second cartridge, said control means stops the accommodation of said photosensitive material within said second cartridge by said accommodating means.

18. A photosensitive material handling apparatus according to claim 1, further comprising:
an accommodating device for accommodating said first cartridge, which is separated from said photosensitive material, and including a storing device for storing data.

19. A photosensitive material handling apparatus according to claim 18, wherein information about said first cartridge and information about a location of said first cartridge, which is accommodated within said accommodating device, are stored in said storing device so as to correspond to each other.

20. A photosensitive material handling apparatus according to claim 18, wherein said separating means separates said photosensitive material from said first cartridge by withdrawing said photosensitive material from said first cartridge, and thereafter, by cutting said photosensitive material along the transverse direction of said photosensitive material, and the information about said first cartridge and information in which the rear end portion of said photosensitive material remains within said first cartridge being stored in said storing device so as to correspond to the information about the location of said first cartridge which is accommodated within said accommodating device.

21. A photosensitive material handling apparatus according to claim 1, further comprising:
rear end forming means for the rear end portion of said photosensitive material when said separating means withdraws said photosensitive material from said first cartridge and separates said photosensitive material.

22. A photosensitive material handling apparatus comprising:
separating means for withdrawing an elongated photosensitive material, which has been photographically exposed, is undeveloped and is accommodated within a first cartridge, from said first cartridge in a state in which said photosensitive material is not exposed to ambient light, said separating means separating said photosensitive material from said first cartridge;

an accommodating device for accommodating said first cartridge which is separated from said photosensitive material;

accommodating means for conveying said photosensitive material, which is separated from said first cartridge by said separating means, while not exposing said photosensitive material to ambient light, and successively accommodating said photosensitive material within a second cartridge, of which an inner portion and an outer portion can be shielded from ambient light, in a state in which an end portion of said photosensitive material is exposed to the exterior of said second cartridge;

curl removing means for making an amount of curling of said photosensitive material to be less than or equal to a certain value when said accommodating means conveys said photosensitive material;

a plurality of detecting means for detecting an indicator which is provided at one of an end portion of said photosensitive material and at a predetermined position of said photosensitive material; and control means for respectively determining the position of the end portion of said photosensitive material based on the results detected by said plurality of detecting means, and when the end portion, which is determined by said respective detecting means, is located at the position separated by a predetermined distance from said second cartridge, said control means stops accommodation of said photosensitive material within said second cartridge by said accommodating means.

* * * * *